United States Patent [19]

Johnson et al.

[11] 4,138,706
[45] Feb. 6, 1979

[54] ELECTRICAL POWER SUPPLY FAULT DETECTING SYSTEM

[75] Inventors: Lauren L. Johnson, Westchester; Robert J. Wilson, Bolingbrook, both of Ill.

[73] Assignee: General Motors Corporation, Detroit, Mich.

[21] Appl. No.: 856,526

[22] Filed: Dec. 1, 1977

[51] Int. Cl.² ............................................. H02H 7/06
[52] U.S. Cl. ....................................... 361/42; 361/47
[58] Field of Search .................... 361/20, 21, 30, 33, 361/42, 47, 48, 44

[56] References Cited

U.S. PATENT DOCUMENTS 3,496,414  2/1970  Logston, Jr. ........................... 361/20

FOREIGN PATENT DOCUMENTS 375233  5/1923  Fed. Rep. of Germany ............. 361/20
1023981 3/1953  France ..................................... 361/47

Primary Examiner—Harry E. Moose, Jr.
Attorney, Agent, or Firm—R. G. Stahr

[57] ABSTRACT

To detect system ground faults in a dual Y-connected output winding group polyphase alternator to direct current power supply system having direct current output circuitry isolated from a selected point of reference or ground potential, an electrical potential is applied across a selected point of reference or a ground potential and the alternator output winding group neutrals. A system ground fault completes a circuit through which this potential energizes the operating coil of an electrical relay having a pair of normally closed contacts connected in series in the alternator exciting field winding energizing circuit to effect the interruption of the alternator exciting field winding energizing circuit. To detect single phase operation faults, an auxiliary polyphase full-wave rectifier circuit is provided for each of the two alternator output winding groups. A single phase operation fault results in the completion of an electrical circuit including the auxiliary rectifier circuits for effecting the interruption of the alternator exciting field winding energizing circuit.

8 Claims, 1 Drawing Figure

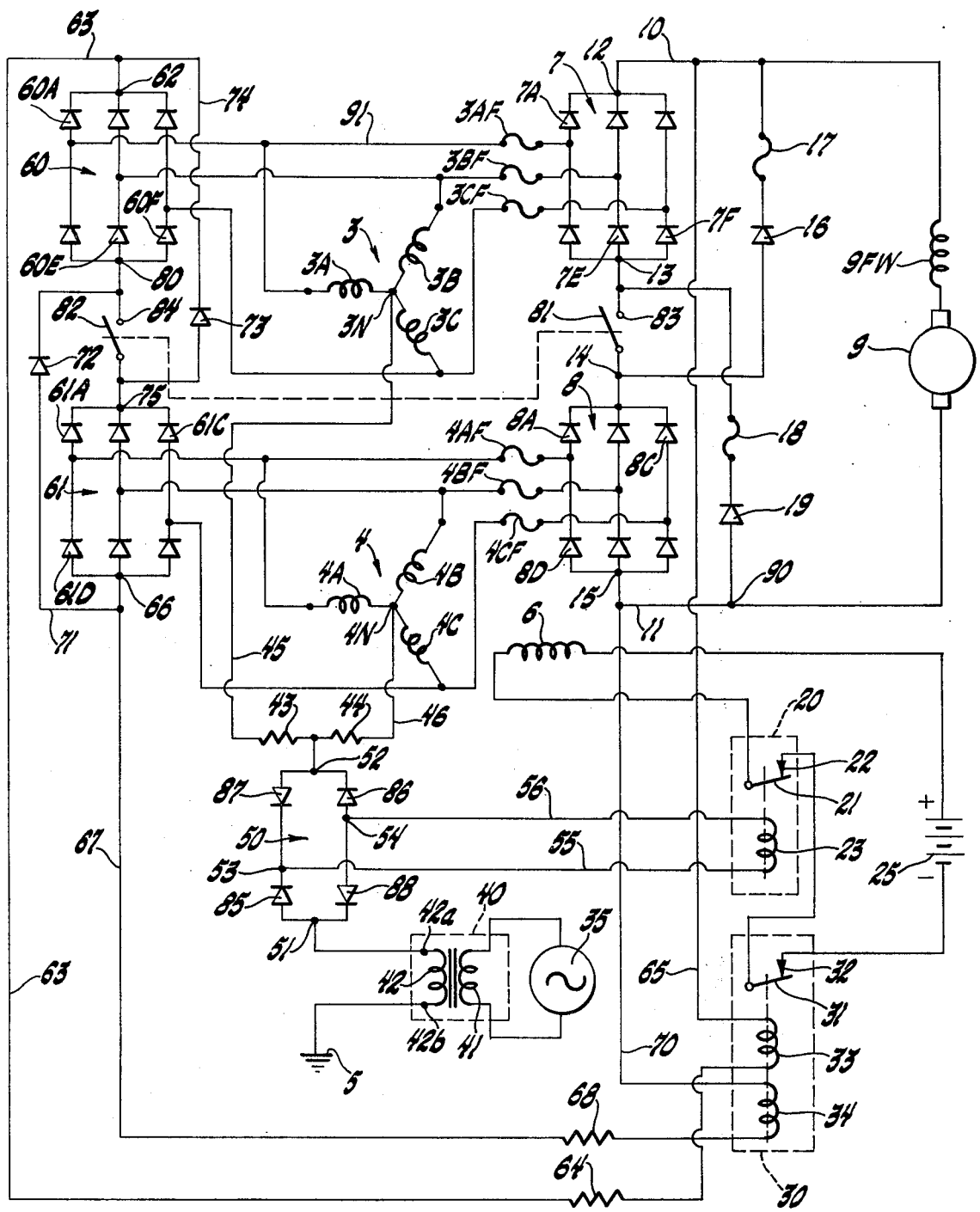

ELECTRICAL POWER SUPPLY FAULT DETECTING SYSTEM

This invention is directed to an electrical power supply fault detecting system and, more specifically, to a polyphase alternator to direct current power supply fault detecting system that is responsive to system ground faults and to single phase operation faults to interrupt the alternator exciting field winding energizing circuit.

With certain types of electrical power supply systems, particularly those employed with Diesel-electrical locomotives, the polyphase output potential of a prime mover driven alternator is full-wave rectified by a polyphase diode bridge type full-wave rectifier circuit. The direct current output potential of the rectifier circuit is applied across a system output circuit which is isolated from ground. With power supply systems of this type, it is extremely important that system ground faults and single phase operation faults be detected.

It is therefore, an object of this invention to provide an improved electrical power supply fault detecting system.

It is another object of this invention to provide an improved polyphase alternator to direct current power supply fault detecting system of the type sensitive to system ground faults to interrupt the alternator exciting field winding energizing circuit.

It is another object of this invention to provide an improved polyphase alternator to direct current power supply fault detecting system that is responsive single phase operation faults to interrupt the alternator exciting field winding energizing circuit.

In accordance with this invention, a polyphase alternator to direct current power supply fault detecting system is provided which, upon the occurrence of either a system ground fault or a single phase operation fault operates to interrupt the alternator exciting field winding energizing circuit.

For a better understanding of the present invention, together with additional objects, advantages, and features thereof, reference is made to the following description and accompanying single FIGURE drawing.

In the drawing, a selected point of reference or ground potential is illustrated by the accepted schematic symbol and is referenced by the numeral 5.

Referring to the drawing, one example of an electrical power supply system with which the fault detecting system of this invention may be employed includes a polyphase alternator having two discrete polyphase output winding groups 3 and 4 and an exciting field winding 6, a main polyphase diode bridge type full-wave rectifier circuit 7 corresponding to alternator output winding group 3 and a main polyphase diode bridge type full-wave rectifier circuit 8 corresponding to alternator output winding group 4. Alternator output winding group 3 includes three output phase windings 3A, 3B and 3C connected in a Y-configuration and having a neutral point 3N and alternator output winding group 4 includes three output phase windings 4A, 4B and 4C connected in a Y-configuration and having a neutral point 4N. The alternator output winding groups 3 and 4 are wound upon the same stator iron in such a manner that the voltages induced in phase windings 3A and 4A, 3B and 4B and 3C and 4C are in phase. The rotor of the alternator is driven by a suitable prime mover, not shown, such as a Diesel engine in a manner well known in the art. The output terminal ends of output phase windings 3A, 3B and 3C of alternator output winding group 3 are connected to respective alternating current input terminals of main rectifier circuit 7 through respective fuses 3AF, 3BF, and 3CF. The output terminal ends of output phase windings 4A, 4B and 4C of alternator output winding group 4 are connected to respective alternating current input terminals of main rectifier circuit 8 through respective fuses 4AF, 4BF and 4CF. Therefore, main rectifier circuit 7 full-wave rectifies the alternating current potentials generated in the output phase windings of alternator output winding group 3 to a direct current potential and main rectifier circuit 8 full-wave rectifies the alternating current potentials generated in the output phase windings of alternator output winding group 4 to a direct current potential. To apply the direct current output potentials of main rectifier circuits 7 and 8 across a system direct current output circuit comprising positive polarity direct current output circuit bus 10 and negative polarity direct current output circuit bus 11, the positive polarity direct current output terminal 12 of main rectifier circuit 7 is connected directly to output circuit bus 10, the positive polarity direct current output terminal 14 of main rectifier circuit 8 is connected to output circuit bus 10 through paralleling diode 16 and fuse 17, the negative polarity direct current output terminal 13 of main rectifier circuit 7 is connected to output circuit bus 11 through fuse 18 and paralleling diode 19 and the negative polarity direct current output terminal 15 of main rectifier circuit 8 is connected directly to output circuit bus 11. The system direct current output circuit comprising positive polarity direct current output circuit bus 10 and negative polarity direct current output circuit bus 11 is isolated from point of reference or ground potential 5.

One or more direct current electric motors, such as series direct current motor 9 having a series field winding 9FW, may be connected across the isolated system positive and negative polarity direct current output circuit buses 10 and 11. Although only one direct current motor is illustrated in the drawing, it is to be specifically understood that more than one motor may be connected across the isolated system output circuit as is well known in the art.

The alternator exciting field winding 6 is connected in an energizing circuit including an energizing potential source, which may be a conventional storage battery 25. This energizing circuit also includes the normally closed contact pair, movable contact 21 and stationary contact 22, of ground fault responsive relay 20 also having an operating coil 23 and the normally closed contact pair, movable contact 31 and stationary contact 32, of single phase operation fault responsive relay 30 also having two operating coils 33 and 34. Although the energizing potential source for alternator exciting field winding 6 is illustrated in the drawing as a storage battery, it is to be specifically understood that this energizing potential source may take various forms such as the rectified output potential of an alternator or any other available direct current potential source suitable for this application.

To provide for system ground fault detection in a manner to be later explained in this specification, an electrical potential is applied across point of reference or ground potential 5 and the neutral points 3N and 4N of respective alternator output winding groups 3 and 4. In the drawing, the source of this electrical potential is illustrated as an alternating current potential source 35 connected across the primary winding 41 of a transformer 40. The secondary winding 42 of transformer 40 is connected across point of reference or ground potential 5 and alternating current input terminal 51 of a single phase diode bridge type full-wave rectifier circuit 50, the other alternating current input terminal 52 of which is connected through parallel resistors 43 and 44 and leads 45 and 46 to respective neutral points 3N and 4N of respective alternator output winding groups 3 and 4. With this arrangement, an alternating current potential is applied across point of reference or ground potential 5 and the neutral points 3N and 4N of respective alternator output winding group 3 and 4 in parallel. Although this source of electrical potential is indicated in the drawing as an alternating current potential source transformer coupled across the previously described circuit, it is to be specifically understood that the alternating current source may be replaced by a direct current potential source without departing from the spirit of the invention. The operating coil 23 of ground fault responsive relay 20 is connected across the positive and negative polarity direct current output terminals 53 and 54 respectively, of rectifier circuit 50 through respective leads 55 and 56.

To provide for system single phase operation fault detection in a manner to be later explained in this specification, an auxiliary polyphase diode bridge type full-wave rectifier circuit 60 corresponding to alternator output winding group 3 and another auxiliary polyphase diode bridge type full-wave rectifier circuit 61 corresponding to alternator output winding group 4 are employed. The output terminal ends of output phase windings 3A, 3B and 3C of alternator output winding group 3 are connected to respective alternating current input terminals of auxiliary rectifier circuit 60 and the output terminal ends of output phase windings 4A, 4B and 4C of alternator output winding group 4 are connected to respective alternating current input terminals of auxiliary rectifier circuit 61. The positive polarity direct current output terminal 62 of auxilary rectifier circuit 60 is connected through lead 63, resistor 64, operating coil 33 of single phase operation responsive relay 30 and lead 65 to positive polarity output circuit bus 10. The negative polarity direct current output terminal 66 of auxiliary rectifier circuit 61 is connected through lead 67, resistor 68, operating coil 34 of single phase operation responsive relay 30 and lead 70 to negative polarity output circuit bus 11 and through lead 71 and diode 72 to the negative polarity direct current output terminal 80 of auxiliary rectifier circuit 60. The positive polarity direct current output terminal 75 of auxiliary rectifier circuit 61 is connected through diode 73 and lead 74 to the positive polarity direct current output terminal 62 of auxiliary rectifier circuit 60. Movable contacts 81 and 82 represent gang operated movable contacts of a double pole-single throw electrical series-parallel operation selecting switch having stationary contacts 83 and 84 corresponding to respective movable contacts 81 and 82. With gang operated movable contacts 81 and 82 operated out of electrical circuit engagement with corresponding stationary contacts 83 and 84, as shown in the drawing, the positive and negative polarity direct current output terminals of both main rectifier circuits 7 and 8 and the positive and negative polarity direct current output terminals of both auxiliary rectifier circuits 60 and 61 are connected across positive and negative polarity output circuit buses 10 and 11 to place all of these rectifier circuits in parallel across positive and negative polarity output circuit buses 10 and 11. With gang operated movable contacts 81 and 82 operated into electrical circuit engagement with respective stationary contacts 83 and 84, main rectifier circuits 7 and 8 are connected in series across positive and negative polarity output circuit buses 10 and 11 and auxiliary rectifier circuits 60 and 61 are connected in series across positive and negative polarity output circuit buses 10 and 11 in parallel with series connected main rectifier circuits 7 and 8.

Upon the occurrence of a system ground fault in the direct current output circuitry, including any load connected thereacross or in the alternating current circuitry connected to the alternating current input terminals of main rectifier circuits 7 and 8 or at neutral points 3N or 4N of respective alternator output winding groups 3 and 4, a ground fault detecting circuit is completed for the electrical potential applied across point of reference or ground potential 5 and the neutral points 3N and 4N of respective alternator output winding groups 3 and 4 in parallel. In a manner to be later explained in detail in this specification, operating coil 23 of ground fault responsive relay 20 is energized upon the completion of a ground fault detecting circuit. Upon the energization of operating coil 23 of ground fault responsive relay 20, movable contact 21 is operated out of electrical circuit closing engagement with stationary contact 22 to interrupt the previously described alternator exciting field winding 6 energizing circuit. Upon the interruption of this energizing circuit, system output potential reduces to substantially zero.

In the event of a ground fault along positive polarity output circuit bus 10 while movable contacts 81 and 82 of the previously described series-parallel operation selecting switch are operated out of electrical circuit engagement with respective stationary contacts 83 and 84, a ground fault detectng circuit is completed and may be traced as follows: During those half cycles of the alternating current potential induced in secondary winding 42 of transformer 40 while terminal end 42a is of a positive polarity with respect to terminal end 42b, this circuit may be traced from terminal end 42a, through alternating current input terminal 51 of rectifier circuit 50, diode 85, positive polarity direct current output terminal 53, lead 55, operating coil 23 of ground fault responsive relay 20, lead 56, the negative polarity direct current output terminals 54 of rectifier circuit 50 and diode 86 to alternating current input terminal 52 at which point the circuit divides into two parallel branches. One of these parallel branches may be traced through resistor 44, lead 46, neutral point 4N and alternator output winding group 4, the positive polarity bank of diodes of main rectifier circuit 8, positive polarity output terminal 14, diode 16, fuse 17 and through the ground fault along the positive polarity output circuit bus 10 and point of reference or ground potential 5 to terminal end 42b of secondary winding 52. The other of these parallel branches may be traced through resistor 43, lead 45, neutral point 3N and alternator output winding group 3, the positive polarity bank of diodes of main rectifier circuit 7, positive polarity output terminal 12 and through the ground fault along positive polarity output circuit bus 10 and point of reference or ground potential 5 to terminal end 42b of secondary winding 42. During those half cycles of the alternating current potential induced in secondary winding 42 of transformer 40 while terminal end 42b is of a postive polarity with respect to terminal end 42a, this circuit may be traced from terminal end 42b, through point of reference or ground potential 5 and the ground fault along positive polarity output circuit bus 10, the load connected across the positive and negative polarity output circuit buses 10 and 11, in the drawing motor 9, to junction 90 at which point the circuit divides into two parallel branches. One of these parallel branches may be traced from junction 90 through paralleling diode 19, fuse 18, the negative polarity output terminal 13 of main rectifier circuit 7, the negative polarity bank of diodes of main rectifier circuit 7, alternator output winding group 3 and neutral point 3N, lead 45 and resistor 43 to alternating current input terminal 52 of rectifier circuit 50. The other of these parallel branches may be traced from junction 90, through negative polarity output terminal 15 of main rectifier circuit 8, the negative polarity bank of diodes of main rectifier circuit 8, alternator output winding group 4 and neutral point 4N, lead 46 and resistor 44 to alternating current input terminal 52 of rectifier circuit 50. From this point, the circuit may be further traced through diode 87, positive polarity output terminal 53, lead 55, operating coil 23 of ground fault responsive relay 20, lead 56, negative polarity output terminal 54 of rectifier circuit 50, diode 88 and alternating current input terminal 51 to terminal end 42a of secondary winding 42.

In the event of a ground fault along negative polarity output circuit bus 11 while movable contacts 81 and 82 of the previously described series-parallel operation selecting switch are operated out of electrical circuit engagement with respective stationary contacts 83 and 84, a ground fault detecting circuit is completed and may be traced as follows: During those half cycles of the alternating current potential induced in secondary winding 42 of transformer 40 while terminal end 42a is of a positive polarity with respect to terminal end 42b, this circuit may be traced from terminal end 42a, through alternating current input terminal 51 of rectifier circuit 50, diode 85, positive polarity direct current output terminal 53, lead 55, operating coil 23 of ground fault responsive relay 20, lead 56, the negative polarity direct current output terminal 54 of rectifier circuit 50 and diode 86 to alternating current input terminal 52 at which point the circuit divides into two parallel branches. One of these parallel branches may be traced through resistor 44, lead 46, neutral point 4N and alternator output winding group 4, the positive polarity bank of diodes of main rectifier circuit 8, positive polarity output terminal 14, paralleling diode 16, fuse 17, positive polarity output circuit bus 10, the load connected across the positive and negative polarity output circuit buses 10 and 11 and through the ground fault along the negative polarity output circuit bus 11 and point of reference or ground potential 5 to terminal end 42b of secondary winding 52. The other of these parallel branches may be traced through resistor 43, lead 45, neutral point 3N and alternator output winding group 3, the positive polarity bank of diodes of main rectifier circuit 7, positive polarity output terminal 12, positive polarity output circuit bus 10, the load connected across the positive and negative polarity output circuit buses 10 and 11 and through the ground fault along negative polarity output circuit bus 11 and point of reference or ground potential 5 to terminal end 42b of secondary winding 42. During those half cycles of the alternating current potential induced in secondary winding 42 of transformer 40 while terminal end 42b is of a positive polarity with respect to terminal end 42a, this circuit may be traced from terminal end 42b, through point of reference or ground potential 5 and the ground fault along negative polarity output circuit bus 11 to junction 90 at which point the circuit divides into two parallel branches. One of these parallel branches may be traced from junction 90 through paralleling diode 19, fuse 18, the negative polarity output terminal 13 of main rectifier circuit 7, the negative polarity bank of diodes of main rectifier circuit 7, alternator output winding group 3 and neutral point 3N, lead 45 and resistor 43 to alternating current input terminal 52 of rectifier circuit 50. The other of these parallel branches may be traced from junction 90, through negative polarity output terminal 15 of main rectifier circuit 8, the negative polarity bank of diodes of main rectifier circuit 8, alternator output winding group 4 and neutral point 4N, lead 46 and resistor 44 to alternating current input terminal 52 of rectifier circuit 50. From this point, the circuit may be further traced through diode 87, positive polarity output terminal 53, lead 55, operating coil 23 of ground fault responsive relay 20, lead 56, negative polarity output terminal 54 of rectifier circuit 50, diode 88 and alternating current input terminal 51 to terminal end 42a of secondary winding 42.

In the event of a ground fault along positive polarity output circuit bus 10 while movable contacts 81 and 82 of the previously described series-parallel operaton selecting switch are operated into electrical circuit engagement with respective stationary contacts 83 and 84, a ground fault detecting circuit is completed and may be traced as follows: During those half cycles of the alternating current potential induced in secondary winding 42 of transformer 40 while terminal end 42a is of a positive polarity with respect to terminal end 42b, this circuit may be traced from terminal end 42a, through alternating current input terminal 51 of rectifier circuit 50, diode 85, positive polarity direct current output terminal 53, lead 55, operating coil 23 of ground fault responsive relay 20, lead 56, the negative polarity direct current output terminal 54 of rectifier circuit 50 and diode 86 to alternating current input terminal 52 at which point the circuit divides into two parallel branches. One of these parallel branches may be traced through resistor 44, lead 46, neutral point 4N and alternator output winding group 4, the positive polarity bank of diodes of main rectifier circuit 8, positive polarity output terminal 14, closed contacts 81 and 83, the negative polarity output terminal 13 of main rectifier circuit 7, main rectifier circuit 7, positive polarity output terminal 12 and through the ground fault along the positive polarity output circuit bus 10 and point of reference or ground potential 5 to terminal end 42b of secondary winding 42. The other of these parallel circuits may be traced through resistor 43, lead 45, neutral point 3N and alternator output winding group 3, the positive polarity bank of diodes of main rectifier circuit 7, positive polarity output terminal 12 and through the ground fault along positive polarity output circuit bus 10 and point of reference or ground potential 5 to terminal end 42b of secondary winding 42. During those half cycles of the alternating current potential induced in secondary winding 42 of transformer 40 while terminal end 42b is of a positive polarity with respect to terminal end 42a, this circuit may be traced from terminal end 42b, through point of reference or ground potential 5 and the ground fault along positive polarity output circuit bus 10, the load connected across the positive and negative polarity output circuit buses 10 and 11, negative polarity output circuit bus 11, negative polarity output terminal 15 of main rectifier circuit 8, the negative polarity bank of diodes of main rectifier circuit 8, the alternator output winding group 4 and neutral point 4N, lead 46, resistor 44, alternating current input terminal 52 of rectifier circuit 50, diode 87, positive polarity output terminal 53, lead 55, operating coil 23 of ground fault responsive relay 20, lead 56, negative polarity output terminal 54 of rectifier circuit 50, diode 88 and alternating current input terminal 51 to terminal end 42a of secondary winding 42. Another parallel path for current flow may be traced from positive polarity output terminal 14 of main rectifier circuit 8, through closed contacts 81 and 83, the negative polarity bank of diodes of main rectifier circuit 7, alternator output winding group 3 and neutral point 3N, lead 45 and resistor 43 to alternating current input terminal 52 of rectifier circuit 50 and thence through the previously described circuit to terminal end 42a of secondary winding 42.

In the event of a ground fault along negative polarity output circuit bus 11 while movable contacts 81 and 82 of the previously described series-parallel operation selecting switch are operated into electrical circuit engagement with respective stationary contacts 83 and 84, a ground fault detecting a circuit is completed and may be traced as follows: During those half cycles of the alternating current potential induced in secondary winding 42 of transformer 40 while terminal end 42a is of a positive polarity with respect to terminal end 42b, this circuit may be traced from terminal end 42a, through alternating current input terminal 51 of rectifier circuit 50, diode 85, positive polarity direct current output terminal 53, lead 55, operating coil 23 of ground fault responsive relay 20, lead 56, the negative polarity direct current output terminal 54 of rectifier circuit 50 and diode 86 to alternating current input terminal 52 at which point the circuit divides into two parallel branches. One of these parallel branches may be traced through resistor 44, lead 46, neutral point 4N and alternator output winding group 4, the positive polarity bank of diodes of main rectifier circuit 8, positive polarity output terminal 14, closed contacts 81 and 83, the negative polarity output terminal 13 of main rectifier circuit 7, main rectifier circuit 7, positive polarity output terminal 12, positive polarity output circuit bus 10, the load connected across the positive and negative output circuit buses 10 and 11 and through the ground fault along the negative polarity output circuit bus 11 and point of reference or ground potential 5 to terminal end 42b of secondary winding 42. The other of these parallel circuits may be traced through resistor 43, lead 45, neutral point 3N and alternator output winding group 3, the positive polarity bank of diodes of main rectifier circuit 7, positive polarity output terminal 12, positive polarity output circuit bus 10, the load connected across the positive and negative polarity output circuit buses 10 and 11 and through the ground fault along negative polarity output circuit bus 11 and point of reference or ground potential 5 to terminal end 42b of secondary winding 42. During those half cycles of the alternating current potential induced in secondary winding 42 of transformer 40 while terminal end 42b is of a positive polarity with respect to terminal end 42a, this circuit may be traced from terminal end 42b, through point of reference or ground potential 5 and the ground fault along negative polarity output circuit bus 11, the negative polarity output terminal 15 of main rectifier circuit 8, the negative polarity bank of diodes of main rectifier circuit 8, the alternator output winding group 4 and neutral point 4N, lead 46, and resistor 44 to alternating current input terminal 52 of rectifier circuit 50, diode 87, positive polarity output terminal 53, lead 55, operating coil 23 of ground fault responsive relay 20, lead 56, negative polarity output terminal 54 of rectifier circuit 50, diode 88 and alternating current input terminal 51 to terminal end 42a of secondary winding 42. Another parallel path for current flow may be traced from positive polarity output terminal 14 of main rectifier circuit 8, through closed contacts 81 and 83, the negative polarity bank of diodes of main rectifier circuit 7, alternator output winding group 3 and neutral point 3N, lead 45, and resistor 43 to alternating current input terminal 52 of rectifier circuit 50 and thence through circuitry previously described to terminal end 42a of secondary winding 42.

In the event of a ground fault along any of the alternating current leads such as lead 91 through which the output terminal end of output phase winding 3a is connected to the corresponding alternating current input terminal of each of main and auxiliary rectifier circuits 7 and 60, a ground fault detecting circuit is completed and may be traced as follows: During those half cycles of the alternating current potential induced in secondary winding 42 of transformer 40 while terminal end 42a is of a positive polarity with respect to terminal end 42b, this circuit may be traced from terminal end 42a, through alternating current input terminal 51 of rectifier circuit 50, diode 85, positive polarity direct current output terminal 53, lead 55, operating coil 23 of ground fault responsive relay 20, lead 56, the negative polarity direct current output terminal 54 of rectifier circuit 50, diode 86, alternating current input terminal 52, resistor 43, lead 45, neutral point 3N, output phase winding 3A and through the ground fault along lead 91 and point of reference or ground potential 5 to terminal end 42b of secondary winding 42. During those half cycles of the alternating current potential induced in secondary winding 42 of transformer 40 while terminal end 42b is of a positive polarity with respect to terminal end 42a, this circuit may be traced from terminal end 42b, through point of reference or ground potential 5 and the ground fault along lead 91, output phase winding 3A to neutral point 3N, lead 45, resistor 43, alternating current input terminal 52 of rectifier circuit 40, diode 87, positive polarity output terminal 53, lead 55, operating coil 23 of ground fault responsive relay 20, lead 56, negative polarity output terminal 54 of rectifier circuit 50, diode 88 and alternating current input terminal 51 to terminal end 42a of secondary winding 42.

A similar ground fault detecting circuit may be traced in the event of a ground fault along any of the other alternating current leads.

In the event of a ground fault at either of neutral points 3N or 4N of respective alternator output winding groups 3 and 4, a ground fault detecting circuit is completed, assuming a ground fault occurs at neutral point 4N, the resulting ground fault detecting circuit may be traced as follows: During those half cycles of the alternating current potential induced in secondary winding 42 of transformer 40 while terminal end 42a is of a positive polarity with respect to terminal end 42b, the ground fault detecting circuit may be traced from terminal end 42a, through alternating current input terminal 51 of rectifier circuit 50, diode 85, positive polarity direct current output terminal 53, lead 55, operating coil 23 of ground fault responsive relay 20, lead 56, the negative polarity direct current output terminal 54 of rectifier circuit 50, diode 86, alternating current input terminal 52, resistor 44, lead 46 to neutral point 4N, and through the ground fault at neutral point 4N and point of reference or ground potential 5 to terminal end 42b of secondary winding 42. During those half cycles of the alternating current potential induced in secondary winding 42 of transformer 40 while terminal end 42b is of a positive polarity with respect to terminal end 42a, this circuit may be traced from terminal end 42b, through point of reference or ground potential 5 and the ground fault at neutral point 4N, lead 46, resistor 44, alternating current input terminal 52 of rectifier circuit 50, diode 87, positive polarity output terminal 53, lead 55, operating coil 23 of ground fault responsive relay 20, lead 56, negative polarity output terminal 54 of rectifier circuit 50, diode 88 and alternating current input terminal 51 to terminal end 42a of secondary winding 42.

A similar ground fault detecting circuit may be traced in the event of a ground fault at neutral point 3N.

A very desirable feature of the system ground fault detecting circuitry just described is that, because of the electrical potential applied across point of reference or ground potential 5 and neutral points 3N and 4N in parallel, ground faults occurring at either neutral point 3N or 4N or both are detected.

Should a direct current potential source be substituted for alternating current potential source 35 and transformer 40, it is desirable to keep rectifier circuit 50 as some of the system ground faults result in a flow of alternating current through the ground fault detecting circuits.

Single phase operation of this electrical power supply system results in the event of an open diode in either of main rectifier circuits 6 or 7 or a blown one of fuses 3AF, 3BF, 3CF, 4AF, 4BF, or 4CF.

In the event of a single phase operation fault, a single phase operation fault detecting circuit including auxiliary rectifier circuits 60 and 61 is completed. In a manner to be later explained in detail in this specification, either operating coil 33 or operating coil 34 of ground fault responsive relay 30 is energized upon the completion of a single phase operation fault detecting circuit. Upon the energization of either operating coil 33 or 34, movable contact 31 of single phase operation fault responsive relay 30 is operated out of electrical circuit closing engagement with stationary contact 32 to interrupt the previously described alternator exciting field winding 6 energizing circuit. As has been brought out before, upon the interruption of this energizing circuit, system outout potential reduces to substantially zero.

In the event of one or more diodes of the positive polarity bank of diodes of main rectifier circuit 7 becoming open or one or more of fuses 3AF, 3BF or 3CF becoming open while movable contacts 81 and 82 of the previously described series-parallel operation selecting switch are operated out of electrical circuit engagement with respective stationary contacts 83 and 84, a single phase operation fault detecting circuit is established for energizing operating coil 33 of single phase operation responsive relay 30. For example, should diode 7A of main rectifier circuit 7 become open or should the corresponding fuse 3AF become open, when the output terminal end of output phase winding 3A of alternator output winding group 3 becomes positive, current flows through diode 60A of auxiliary rectifier circuit 60, positive polarity output terminal 62, lead 63, resistor 64, operating coil 33 of single phase operation responsive relay 30 and lead 65 to positive polarity output circuit bus 10.

In the event of one or more diodes of the negative polarity bank of diodes of main rectifier circuit 7 becoming open or one or more of fuses 3AF, 3BF, or 3CF becoming open while movable contacts 81 and 82 of the previously described series-parallel operation selelcting switch are operated out of electrical circuit engagement with respective stationary contacts 83 and 84, a single phase operation fault detecting circuit is established for energizing operating coil 34 of single phase operation responsive relay 30. For example, should diode 7E of main rectifier circuit 7 become open or should corresponding fuse 3BF become open, when the output terminal end of output phase winding 3B of alternator output winding group 3 becomes negative, current flows from positive polarity output terminals 12 and 14 of main rectifier circuits 7 and 8, through positive polarity output circuit bus 10, the load connected across positive and negative polarity output circuit buses 10 and 11, motor 9 in the drawing, negative polarity output circuit bus 11, lead 70, operating coil 34 of single phase operation responsive relay 30, resistor 68, lead 67 and 71, diode 72, the negative polarity output terminal 80 of auxiliary rectifier circuit 60, diode 60E and the corresponding alternating current input terminal to the output terminal end of output phase winding 3B.

In the event of one or more diodes of the positive polarity bank of diodes of main rectifier circuit 8 becoming open or one or more of fuses 4AF, 4BF or 4CF becoming open while movable contacts 81 and 82 of the previously described series-parallel operation selecting switch are operated out of electrical circuit engagement with respective stationary contacts 83 and 84, a single phase operation fault detecting circuit is established for energizing operating coil 33 of single phase operation responsive relay 30. For example, should diode 8C of main rectifier circuit 8 become open or should the corresponding fuse 4CF become open, when the output terminal end of output phase winding 4C of alternator output winding group 4 becomes positive, current flows through diode 61c of auxiliary rectifier circuit 61, positive polarity output terminal 75, diode 73, leads 74 and 63, resistor 64, operating coil 33 of single phase operation responsive relay 30 and lead 65 to positive polarity output circuit bus 10.

In the event of one or more diodes of the negative polarity bank of diodies of main rectifier circuit 8 becoming open or one or more of fuses 4AF, 4BF or 4CF becoming open while movable contacts 81 and 82 of the previously described series-parallel operation selecting switch are operated out of electrical circuit engagement with respective stationary contacts 83 and 84, a single phase operation fault detecting circuit is established for energizing operating coil 34 of single phase operation responsive relay 30. For example, should diode 8D of main rectifier circuit 8 become open or should corresponding fuse 4AF become open, when the output terminal end of output phase winding 4A of alternator output winding group 4 becomes negative, current flows from positive polarity output terminals 12 and 14 of main rectifier circuits 7 and 8, through positive polarity output circuit bus 10, the load connected across positive and negative polarity output circuit buses 10 and 11, negative polarity output circuit bus 11, lead 70, operating coil 34 of single phase operation responsive relay 30, resistor 68, lead 67, the negative polarity output terminal 66 of auxiliary rectifier circuit 61, diode 61D and the corresponding alternating current input terminal to the output terminal end of output phase winding 4A.

In the event of one or more diodes of the negative polarity bank of diodes of main rectifier circuit 7 becoming open or one or more fuses 3AF, 3BF, or 3CF becoming open while movable contacts 81 and 82 of the previously described series-parallel operation selecting switch are operated into electrical circuit engagement with respective stationary contacts 83 and 84, a single phase operation fault detecting circuit is established for energizing operating coil 34 of single phase operation responsive relay 30. For example, should diode 7F of main rectifier circuit 7 become open or should corresponding fuse 3CF become open, when the output terminal end of output phase winding 3C of alternator output winding group 3 becomes negative, current flows from positive polarity output terminal 12 of main rectifier circuit 7, through positive polarity output circuits bus 10, the load connected across positive and negative polarity output circuit buses 10 and 11, negative polarity output circuit bus 11, lead 70, operating coil 34 of single phase operation responsive relay 30, resistor 68, lead 67, auxiliary rectifier circuit 61, closed contacts 82 and 84, negative polarity output terminal 80 of auxiliary rectifier circuit 60, diode 60F and the corresponding alternating current input terminal to the output terminal end of output phase winding 3C.

In the event of one or more diodes of the positive polarity bank of diodes of main rectifier circuit 8 becoming open or one or more of the fuse 4AF, 4BF or 4CF becoming open while movable contacts 81 and 82 of the previously described series-parallel operation selecting switch are operated into electrical circuit engagement with respective stationary contacts 83 and 84, a single phase operation fault detecting circuit is established for energizing operating coil 33 of single phase operation responsive relay 30. For example, should diode 8A of main rectifier circuit 8 become open or should the corresponding fuse 4AF become open, when the output terminal end of output phase winding 4A of alternator output winding group 4 becomes positive, current flows through diode 61A of auxiliary rectifier circuit 61, positive polarity output terminal 75, closed contacts 82 and 84, auxiliary rectifier circuit 60, lead 63, resistor 64, operating coil 33 of single phase operation responsive relay 30 and lead 65 to positive polarity output circuit bus 10.

In the drawing, single phase operation fault responsive relay 30 is illustrated as a single pole-single throw relay having a normally closed contact pair and two operating coils. It is to be specifically understood that two single pole-single throw relays each having an operating coil and a normally closed contact pair connected in series with each other and with the normally closed contact pair of ground fault responsive relay 20 in the alternator exciting field winding energizing circuit may be substituted for single phase operation fault responsive relay 30 without departing from the spirit of the invention. Also, alternate electrical switching devices having similar electrical characteristics as relays 20 and 30 may be substituted therefor without departing from the spirit of the invention.

While movable contacts 81 and 82 of the previously described series-parallel operation selecting switch are operated out of electrical circuit closing engagement with respective stationary contacts 83 and 84, the hereinabove described circuitry provides for the energization of operating coil 33 of single phase operation fault responsive relay 30 in the event of either paralleling diode 16 or fuse 17 or both becoming open and for the energization of operating coil 34 of single phase operation fault responsive relay 30 in the event of either paralleling diode 19 or fuse 18 or both becoming open. Should either paralleling diode 16 or fuse 17 or both become open, current flows from alternator output winding group 4, through the positive polarity bank of diodes of auxiliary rectifier circuit 61, positive polarity output terminal 75, diode 73, leads 74 and 63, resistor 64, operating coil 33 of single phase operation fault responsive relay 30 and lead 65 to positive polarity output circuit bus 10. Should either paralleling diode 19 or fuse 18 or both become open, current flows from alternator output winding group 3, through the positive polarity bank of diodes of main rectifier circuit 7, positive polarity output terminal 12, positive polarity output circuit bus 10, the load across positive and negative polarity output circuit buses 10 and 11, negative polarity output circuit bus 11, lead 70, operating coil 34 of single phase operation fault responsive relay 30, resistor 68, leads 67 and 71, diode 72, negative polarity output terminal 80 of auxiliary rectifier circuit 60 and the negative polarity bank of diodes of auxiliary rectifier circuit 60 to alternator output winding group 3. As has been previously brought out, upon the energization of either of operating coils 33 or 34, movable contact 31 of single phase operation responsive relay 30 is operated out of electrical circuit engagement with stationary contact 32 to interrupt the previously described alternator exciting field winding 6 energizing circuit.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. An electrical power supply fault detecting system for use with an alternator of the type having an electrically energized exciting field winding and two discrete polyphase output winding groups each having a neutral point, comprising:

means for full-wave rectifying the output potential of each of said alternator output winding groups and for applying the rectified potential across a system direct current output circuit isolated from a selected point of reference or ground potential;

means for applying an electrical potential across a selected point of reference or ground potential and said neutral points of said output winding groups in parallel whereby a system fault to said selected point of reference or ground potential completes an electrical circuit for said electrical potential; and means responsive to the flow of current through said electrical circuit as a result of a system fault to said point of reference or ground potential for deenergizing said alternator exciting field winding.

2. An electrical power supply fault detecting system for use with an alternator of the type having an electrically energized exciting field winding and two discrete polyphase output winding groups each having a neutral point, comprising:

means for full-wave rectifying the output potential of each of said alternator output winding groups and for applying the rectified potential across a system direct current output circuit isolated from a selected point of reference or ground potential;

means for applying an alternating current potential across a selected point of reference or ground potential and said neutral points of said output winding groups in parallel whereby a system fault to said selected point of reference or ground potential completes an electrical circuit for said alternating current potential; and means responsive to the flow of current through said alternating current circuit as a result of a system fault to said point of reference or ground potential for deenergizing said alternator exciting field winding.

3. An electrical power supply fault detecting system for use with an alternator of the type having an exciting field winding connected in an energizing circuit including an energizing potential source and two discrete polyphase output winding groups each having a neutral point, comprising:

means for full-wave rectifying the output potential of each of said alternator output winding groups and for applying the rectified potential across a system direct current output circuit isolated from a selected point of reference or ground potential;

an electrical relay having a normally closed contact pair connected in series in said alternator exciting field winding energizing circuit and an operating coil; and means for applying an electrical potential across a selected point of reference or ground potential and the series combination of said relay operating coil and said neutral points of said output winding groups in parallel whereby a system fault to said selected point of reference or ground potential completes an energizing circuit for said relay operating coil to effect the interruption of said alternator exciting field winding energizing circuit.

4. An electrical power supply fault detecting system for use with an alternator of the type having an exciting field winding connected in an energizing circuit including an energizing potential source and two discrete polyphase output winding groups each having a neutral point, comprising:

means for full-wave rectifying the output potential of each of said alternator output winding groups and for applying the rectified potential across a system direct current output circuit isolated from a selected point of reference or ground potential;

an electrical relay having a normally closed contact pair connected in series in said alternator exciting field winding energizing circuit and an operating coil; and means for applying an alternating current potential across a selected point of reference or ground potential and the series combination of said relay operating coil and said neutral points of said output winding groups in parallel whereby a system fault to said selected point of reference or ground potential completes an energizing circuit for said relay operating coil to effect the interruption of said alternator exciting field winding energizing circuit.

5. An electrical power supply fault detecting system for use with an alternator of the type having an electrically energized exciting field winding and two discrete polyphase output winding groups each having a neutral point, comprising:

a diode bridge type rectifier circuit corresponding to each said output winding group for full-wave rectifying the output potential of respective said alternator output winding groups;

means for applying the rectified output potential of said rectifier circuits across a system direct current output circuit isolated from a selected point of reference or ground potential;

means for applying an electrical potential across a selected point of reference or ground potential and said neutral points of said output winding groups in parallel whereby a system fault to said selected point of reference or ground potential completes an electrical circuit for said electrical potential;

means responsive to the flow of current through said electrical circuit as a result of a system fault to said point of reference or ground potential for deenergizing said alternator exciting field winding; and means responsive to a single phase operation fault for deenergizing said alternator exciting field winding.

6. An electrical power supply fault detecting system for use with an alternator of the type having an electrically energized exciting field winding and two discrete polyphase output winding groups each having a neutral point, comprising:

a diode bridge type rectifier circuit corresponding to each said output winding group for full-wave rectifying the output potential of respective said alternator output winding groups;

means for applying the rectified output potential of said rectifier circuits across a system direct current output circuit isolated from a selected point of reference or ground potential;

means for applying an alternating current potential across a selected point of reference or ground potential and said neutral points of said output winding groups in parallel whereby a system fault to said selected point of reference or ground potential completes an electrical circuit for said alternating current potential;

means responsive to the flow of current through said alternating current circuit as a result of a system fault to said point of reference or ground potential for deenergizing said alternator exciting field winding; and means responsive to a single phase operation fault for deenergizing said alternator exciting field winding.

7. An electrical power supply fault detecting system for use with an alternator of the type having an electrically energized exciting field winding and two discrete polyphase output winding groups each having a neutral point, comprising:

a main diode bridge type rectifier circuit corresponding to each said output winding group for full-wave rectifying the output potential of respective said alternator output winding groups;

means for applying the rectified output potential of said rectifier circuits across a system direct current output circuit isolated from a selected point of reference or ground potential;

means for applying an electrical potential across a selected point of reference or ground potential and said neutral points of said output winding groups in parallel whereby a system fault to said selected point of reference or ground potential completes an electrical circuit for said electrical potential;

means responsive to the flow of current through said electrical circuit as a result of a system fault to said point of reference or ground potential for deenergizing said alternator exciting field winding;

an auxiliary diode bridge type full-wave rectifier circuit corresponding to each said output winding group, each of said auxiliary rectifier circuits having positive and negative polarity output terminals;

circuit means for connecting said positive polarity output terminal of a selected one of said auxiliary rectifier circuits and said negative polarity output terminal of the other one of said auxiliary rectifier circuits across said sytem output circuit; and electrical switch actuating means included in said circuit means for effecting the interruption of said alternator exciting field winding energizing circuit in response to current flow through said circuit means.

8. An electrical power supply fault detecting system for use with an alternator of the type having an electrically energized exciting field winding and two discrete polyphase output winding groups each having a neutral point, comprising:

a main diode bridge type rectifier circuit corresponding to each said output winding group for fullwave rectifying the output potential of respective said alternator output winding groups;

means for applying the rectified output potential of said rectifier circuits across a system direct current output circuit isolated from a selected point of reference or ground potential;

means for applying an electrical potential across a selected point of reference or ground potential and said neutral points of said output winding groups in parallel whereby a system fault to said selected point of reference or ground potential completes an electrical circuit for said electrical potential;

means responsive to the flow of current through said electrical circuit as a result of a system fault to said point of reference or ground potential for deenergizing said alternator exciting field winding;

an auxiliary diode bridge type full-wave rectifier circuit corresponding to each said output winding group, each of said auxiliary rectifier circuits having positive and negative polarity output terminals;

an electrical relay having a normally closed contact pair connected in series in said alternator exciting field winding energizing circuit and first and second operating coils; and means for connecting said positive polarity output terminal of a selected one of said auxiliary rectifier circuits and said negative polarity output terminal of the other one of said auxiliary rectifier circuits across said isolated system output circuit through said first relay operating coil and said second relay operating coil, respectively.

* * * * *

UNITED STATES PATENT AND TRADEMARK OFFICE
CERTIFICATE OF CORRECTION

PATENT NO. : 4,138,706

DATED : February 6, 1979

INVENTOR(S) : Lauren L. Johnson and Robert J. Wilson

It is certified that error appears in the above-identified patent and that said Letters Patent are hereby corrected as shown below:

Column 4, line 57, "52" should read -- 42 --; Column 5, line 55, "52" should read -- 42 --; Column 8, line 46, "40" should read -- 50 --; Column 9, line 51, "outout" should read -- output --.

Signed and Sealed this

Twelfth Day of June 1979

[SEAL]

Attest:

RUTH C. MASON
Attesting Officer

DONALD W. BANNER
Commissioner of Patents and Trademarks